(12) United States Patent
Escanes Garcia

(10) Patent No.: US 8,087,259 B2
(45) Date of Patent: Jan. 3, 2012

(54) CONTROL METHOD AND SYSTEM

(75) Inventor: Ferran Escanes Garcia, Barcelona (ES)

(73) Assignee: Appliances Components Companies Spain, S.A., Barcelona (ES)

( * ) Notice: Subject to any disclaimer, the term of this patent is extended or adjusted under 35 U.S.C. 154(b) by 957 days.

(21) Appl. No.: 11/661,827

(22) PCT Filed: Jun. 21, 2005

(86) PCT No.: PCT/ES2005/070095
§ 371 (c)(1),
(2), (4) Date: Dec. 17, 2007

(87) PCT Pub. No.: WO2006/042893
PCT Pub. Date: Apr. 27, 2006

(65) Prior Publication Data
US 2008/0223059 A1  Sep. 18, 2008

(30) Foreign Application Priority Data

Sep. 14, 2004  (ES) .................................. 200402190

(51) Int. Cl.
*F25B 49/00* (2006.01)
(52) U.S. Cl. ........................... 62/228.4; 62/230; 318/479
(58) Field of Classification Search .................. 62/228.4, 62/230; 318/479, 504, 461, 609, 610
See application file for complete search history.

(56) References Cited

U.S. PATENT DOCUMENTS

| | | | | |
|---|---|---|---|---|
| 4,658,593 A | * | 4/1987 | Stenvinkel | 62/126 |
| 4,856,286 A | * | 8/1989 | Sulfstede et al. | 62/89 |
| 4,873,453 A | | 10/1989 | Schmerda et al. | |
| 5,375,429 A | * | 12/1994 | Tokizaki et al. | 62/235.1 |
| 5,384,526 A | * | 1/1995 | Bennett | 318/610 |
| 5,518,373 A | * | 5/1996 | Takagi et al. | 417/45 |
| 5,555,736 A | * | 9/1996 | Wills et al. | 62/187 |
| 5,801,500 A | * | 9/1998 | Jensen et al. | 318/400.09 |
| 6,367,273 B2 | * | 4/2002 | Takagi et al. | 62/230 |
| 6,415,619 B1 | * | 7/2002 | Bash et al. | 62/228.4 |
| 6,584,792 B2 | * | 7/2003 | Bay | 62/228.4 |
| 6,626,002 B1 | * | 9/2003 | Notohara et al. | 62/228.4 |
| 6,639,377 B2 | * | 10/2003 | Iwaji et al. | 318/700 |
| 6,642,681 B2 | * | 11/2003 | Kawabata et al. | 318/431 |
| 6,786,056 B2 | * | 9/2004 | Bash et al. | 62/199 |
| 7,012,393 B2 | * | 3/2006 | De Frutos et al. | 318/434 |

(Continued)

FOREIGN PATENT DOCUMENTS

ES    2 193 173    11/2003

(Continued)

OTHER PUBLICATIONS

English Abstract of JP 8-266087 dated Oct. 11, 1996.

(Continued)

*Primary Examiner* — George Nguyen
(74) *Attorney, Agent, or Firm* — Ladas & Parry LLP

(57) ABSTRACT

The invention relates to a control method and system comprising an electronic control unit (11) controlling the electric current power supply from an electric power source to a motor-compressor arrangement (12, 13); the electronic control unit comprises a conversion means which is connected to an inversion means (15) to supply the voltage demanded by the motor (12). A PWM pulse width regulator (16) generates the switching signals for all the switching elements of the unit (11) relating to said demanded voltage.

2 Claims, 1 Drawing Sheet

U.S. PATENT DOCUMENTS

| | | | |
|---|---|---|---|
| 7,379,309 B2 * | 5/2008 | Isurin et al. | 363/17 |
| 7,431,568 B2 * | 10/2008 | Brown et al. | 417/44.1 |
| 7,619,906 B2 * | 11/2009 | Schnetzka | 363/34 |
| 2003/0184161 A1 | 10/2003 | Chu | |
| 2006/0275137 A1 * | 12/2006 | Kempfer et al. | 417/44.1 |
| 2007/0007916 A1 * | 1/2007 | Wu | 318/66 |
| 2008/0191587 A1 * | 8/2008 | Kim | 310/68 C |
| 2010/0064706 A1 * | 3/2010 | Hattori et al. | 62/157 |

FOREIGN PATENT DOCUMENTS

| | | |
|---|---|---|
| JP | 8-266087 | 10/1996 |
| JP | 8-266087 A | 10/1996 |

OTHER PUBLICATIONS

Espacenet English abstract of ES 2 193 173.
Espacenet English abstract of JP 8-266087 A.

* cited by examiner

CONTROL METHOD AND SYSTEM

OBJECT OF THE INVENTION

The present invention relates to a method for governing and controlling the power supply from an electric power source to an assembly comprising an electric motor which can be connected to a hermetically encapsulated refrigeration compression unit.

STATE OF THE ART

It is known that electric cooling apparatuses can be fed from electric power sources such as batteries which are charged by means of an electric generator activated from an internal combustion engine or from a photovoltaic cell panel or the like.

A drawback of the aforementioned system is derived from the fact that the voltage level of the battery varies over time, i.e. the voltage level of the battery is greater than the rated voltage thereof when it is charged, and when the battery is discharged, its voltage decreases progressively, being less than the rated voltage thereof, and as a result the battery must be disconnected when its voltage level reaches a certain lower voltage level for the purpose of protecting the battery.

It is consequently necessary to develop a control system for controlling the electric power supply from a battery to an assembly of an electric motor which can be connected to a hermetically encapsulated refrigeration compression unit such that the life of the battery is ensured.

CHARACTERIZATION OF THE INVENTION

The present invention seeks to solve or reduce one or more of the aforementioned drawbacks by means of a control method for controlling the electricity supply as claimed in claim 1. Embodiments of the invention are established in the dependent claims.

An object of the present invention is to implement a method for controlling the electric power supply from an electric power source which can be connected to an electric motor through a control unit; wherein the control unit receives a voltage from the electric power source. A PID algorithm calculates the voltage which must be applied to the windings of the electric motor to reach the predetermined desired speed, and generates by means of a PWM modulator the switching signals relating to the calculated voltage signal, to be applied to each of the switching elements comprised in said control unit, so that the motor reaches the desired operating speed.

Another object of the present invention is to conserve the life of the battery.

Yet another object of the present invention is to maintain the temperature of a refrigerated enclosure without placing the battery at a disadvantage.

BRIEF DESCRIPTION OF THE DRAWINGS

Devices embodying the invention will now be described only by way of example and with reference to the attached drawing, in which.

DESCRIPTION OF THE INVENTION

Figure 1:
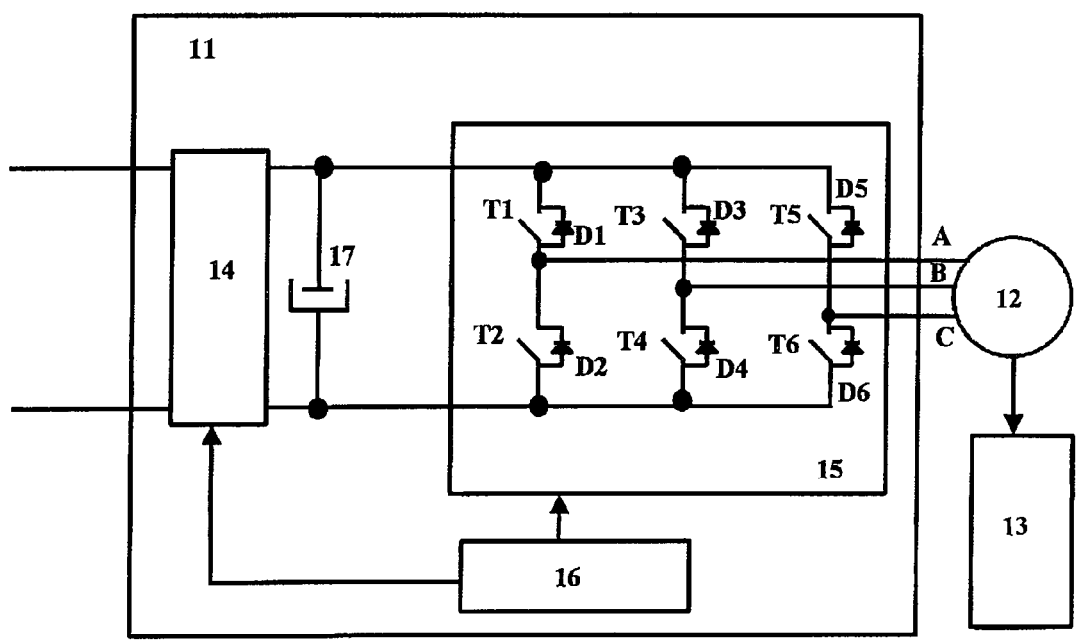
FIG. 1 shows in a block diagram an electronic control unit connected to a hermetically encapsulated motor-compressor combination according to the invention.

A block diagram of an electronic control means 11 connected to a combination of an electric motor 12 and to a compression means 13 and to an electric power source is schematically illustrated below with reference to FIG. 1.

The control unit 11 comprises an energy conversion means 14 receiving energy from the electric power source such as a battery or the like, not shown, which can be connected to an electric generator, not shown, the function of which is to recharge the battery.

The converter 14 is carried out according to a boost topology, such as a boost converter.

The control unit 11 also includes an inversion means 15 such as a three-phase inverter connected through a pair of input terminals to a pair of output terminals of the boost converter 14. The control unit 11 also includes output terminals whereby it is connected to the windings of a direct current motor 12 without brushes and without sensors in the position of the rotor, which is in turn coupled to the compressor 13. A capacitor 17 is connected in parallel to the input terminals of the three-phase inverter 15.

The boost converter 14 and the three-phase inverter 15 are widely known in the state of the art and their operation will not be described in detail. Both devices 14, 15 include switching elements such as MOSFET, IGBT field-effect transistors or the like working in cutoff and conduction mode.

The control unit 11 includes a microprocessor, not shown, executing a PID (proportional-integral-derivative) algorithm to calculate the voltage demanded by the motor 12 which is necessary to reach and maintain a predetermined speed.

The control unit 11 also includes a pulse width modulation (PWM) regulator 16 which is connected to all the switching elements of the control unit 11, so as to generate the switching signals which are applied to each switching element at each instant from the demanded voltage, as a result a voltage will be generated which is applied at each instant to the windings of the motor 12, the latter reaching the necessary speed so as to maintain the refrigeration conditions and conserve the life of the battery.

The speed of the motor 12 can be predetermined and fixed or depend on the battery voltage, which is variable within a predetermined interval, i.e. when the battery voltage reaches its lower operating voltage value, the motor 12 must rotate at a predetermined minimum value and when the voltage reaches its upper operating voltage value, the motor must rotate at a predetermined maximum value.

The speed can also be variable, calculated through an algorithm analyzing the temperature of the refrigerated enclosure or the work cycles of a thermostat maintaining said temperature.

In summary, the speed at which the motor 12 must rotate is known at each instant. Once the speed is known, the PID algorithm calculates the voltage level which must be applied to the windings of the motor 12 so as to reach said speed. Once the necessary voltage value has been calculated, the PWM modulator 16 generates the corresponding switching signals for each switching element so that the motor 12 rotates at the desired speed. The switching signals make the switching elements of the control unit 11 work in cutoff and conduction mode.

Two different circumstances can occur in any previously described case, which are that the voltage demanded by the motor 12, namely calculated by the PID algorithm, is greater than the battery voltage and that the voltage demanded by the motor 12 is less than the battery voltage.

In the event that the motor 12 demands a voltage value that is greater than the voltage value supplied from the battery, the voltage delivered to the boost converter 14 from the battery is transformed into a higher voltage. This transformation is controlled by the PWM modulator 16 generating a switching signal, a work cycle, at one of its outputs, which signal is applied to the switch of the boost converter 14 such that the converter 14 converts the received voltage into another higher voltage which is applied to the windings of the motor 12 through the three-phase inverter 15, which works without modulation.

In the event that the motor 12 demands a voltage value less than the voltage value supplied from the battery, the PWM modulator 16 generates a permanent cutoff signal which is applied to the switch of the boost converter 14, such that said switch does not conduct and there is a transfer of non-converted power between the input and output of the boost converter 14. In order to accommodate the voltage level received from the battery to the value demanded by the motor 12, the PWM modulator 16 generates the corresponding modulated signals, work cycles, for each of the switching elements of the three-phase inverter 15, such that the voltage received from the battery is substantially cut down to the voltage value demanded from the motor 12.

The embodiments and examples established in this specification are set forth as the best explanation of the present invention and its practical application and to thus allow the persons skilled in the art to put the invention into practice and use it. Nevertheless, the persons skilled in the art will admit that the description and the previous examples have been set forth for the purpose of illustration and only as an example. The description as it is set forth is not intended to be comprehensive or to limit the invention to the precise described form. Many modifications and variations are possible in the light of the previous teachings without departing from the essence and scope of the following claims.

The invention claimed is:

1. A system for controlling an electric power supply from an electric power source which can be connected to an electric motor (12) through a control unit (11), wherein the electric motor (12) can in turn be connected to a compression means (13), said system comprising:
   means for detecting a voltage of the electric power source;
   means for predetermining a desired operating speed of the electric motor (12);
   means for calculating a voltage signal which must be applied to windings of the electric motor (12) to reach the predetermined desired operating speed; and
   a PWM pulse width regulator (16) generating switching signals relating to the calculated voltage signal, to be applied to each of switching elements included in the control unit (11), so that the motor (12) reaches the desired operating speed,
   wherein
   the control unit (11) further includes energy conversion means (14) receiving energy from the electric power source, and
   the energy conversion means (14) comprise a switching element which is in a permanent cutoff mode when the voltage level demanded by the electric motor (12) is lower than or equal to the voltage level of the electric power source and in a modulation mode when the voltage level demanded by the electric motor (12) is greater than the voltage level of the electric power source.

2. A system according to claim 1, wherein
   the energy conversion means (14) is a boost converter,
   the control unit (11) further includes three-phase inversion means (15) connected to the energy conversion means (14) which is in turn connected to the electric motor-compressor assembly (12, 13), and
   each switching element of the three-phase inversion means (15) works in permanent conduction and in cutoff when the voltage of the electric motor (12) is greater than the voltage of the electric power source and works in modulation and in cutoff when the voltage of the electric motor (12) is less than or equal to the voltage level of the electric power source.

* * * * *